(12) United States Patent
Lippincott

(10) Patent No.: US 6,684,816 B2
(45) Date of Patent: Feb. 3, 2004

(54) PET AREAS MAT

(76) Inventor: Judith G. Lippincott, Apt. 2, 802 W. Hill St., Champaign, IL (US) 61820

( * ) Notice: Subject to any disclaimer, the term of this patent is extended or adjusted under 35 U.S.C. 154(b) by 0 days.

(21) Appl. No.: 10/283,616

(22) Filed: Oct. 30, 2002

(65) Prior Publication Data

US 2003/0097996 A1 May 29, 2003

Related U.S. Application Data

(60) Provisional application No. 60/338,545, filed on Nov. 28, 2001.

(51) Int. Cl.$^7$ ............................. A01K 29/00; A01K 1/015
(52) U.S. Cl. ........................................ 119/171; 119/169
(58) Field of Search ................................ 119/169, 171, 119/526

(56) References Cited

U.S. PATENT DOCUMENTS

| | | | | |
|---|---|---|---|---|
| 3,284,273 A | * | 11/1966 | Prentice | 119/169 |
| 4,907,539 A | * | 3/1990 | Abulhasan | 119/61 |
| 5,482,007 A | * | 1/1996 | Kumlin | 119/526 |
| 5,630,376 A | * | 5/1997 | Ochi et al. | 119/169 |
| 5,653,195 A | * | 8/1997 | Young | 119/526 |
| 5,797,347 A | * | 8/1998 | Ochi | 119/169 |
| 5,797,352 A | * | 8/1998 | Ebert | 119/652 |
| 5,881,677 A | * | 3/1999 | Schmitt | 119/526 |
| 6,082,302 A | * | 7/2000 | Thaler et al. | 119/161 |
| 6,220,205 B1 | * | 4/2001 | Massie | 119/28.5 |
| 6,357,388 B1 | * | 3/2002 | Holtrop et al. | 119/28.5 |
| 6,532,897 B1 | * | 3/2003 | Adolfsson et al. | 119/169 |

* cited by examiner

Primary Examiner—Charles T. Jordan
Assistant Examiner—Elizabeth Shaw

(57) ABSTRACT

A pet areas mat for cleanliness where small animals eat, drink, are housed in a cage, or perform other functions, use of a litter box or litter pan. The mat is generally rectangular or oblong in shape and is constructed of a material that is absorbent on one side and laminated and non-absorbent on the reverse side, forming a moisture barrier. Stays are constructed on the mat by stitching, at various intervals, a binding to folds of the aforementioned material in a horizontal, vertical or concentrical pattern. The same binding is sewn on the perimeter of the mat. The stays and perimeter binding function to contain debris on, or in the general area of, the mat. The mat also absorbs liquids, the animal's drinking water and the animal's bodily fluids. The pet areas mat is very convenient for pet owners, as it is disposable and machine washable in cold water and must be air dried.

13 Claims, 1 Drawing Sheet

PET AREAS MAT

This Application is based upon provisional U.S. Patent Application 60/338,545, filed on Nov. 28, 2001.

BACKGROUND OF THE INVENTION

This invention relates to a mat placed for cleanliness in areas where small animals eat, drink, are housed in a cage, or perform other functions, the use of a litter box or litter pan. This problem has always been associated with pets who, for any period of time, are indoors, requiring maintenance of their living areas.

Some existing devices are those used with cat litter boxes, to aid in removing litter from the bottom of the cat's paws, as they exit the litter box. There are three types: a separate device, an attached device and a rectangle of artificial turf. The separate device is available as a separate purchase; is constructed of hard plastic, rubber, commercial grade carpeting or a combination of these materials; is generally square or rectangular in shape; and, lies flat next to the litter box, U.S. Pat. No. 5,797,352, Paw cleaning litter mat. The attached device is actually a manufactured part of the litter box; is constructed of the same materials as the separate device; is generally rectangular in shape; and, is typically characterized as a ramp, because an angle exists from the litter box to the surface upon which it rests, U.S. Pat. No. 6,082,302, Self-cleaning litter box. Either of these devices may contain grooves, which, are claimed, along with any commercial grade carpeting, to remove litter from the cat's paws. With either of these devices, the cat must exit the litter box by walking on the device for it to have any effectiveness, which indicates that the litter box must be covered, allowing for only one exit. Cat litter boxes are available with and without covers, and covered litter boxes are more expensive and require more maintenance. The rectangle of artificial turf resembles the doormats made of artificial turf, used for wiping one's feet before entering indoors from the outside. This mat is placed under the litter box to trap the litter as the cat exits the litter box, U.S. Pat. No. 6,357,388, Cat litter mat. The litter remaining in this mat is very difficult to remove, resulting in a significant maintenance task to the pet owner and, eventually, the litter and pet bodily fluids trapped between the long fibers of this mat are a potential unsanitary, health condition, unless the mat is very thoroughly washed. All of these existing devices must be hand washed and are non-absorbent, unless they contain commercial grade carpeting, which is frequently treated to resist absorbing moisture or stains.

An available device for use in areas where small animals eat and drink is a rectangular shaped, rubber mat, with a slightly rough surface, used for placement of food and water dishes, U.S. Pat. No. 4,907,539, Pet food bowl and mat. Another existing mat, used for protecting the floor of an animal confinement pen, has grooves and is constructed of rubber or polyethylene, U.S. Pat. No. 6,220,205, Mat for protecting floors in an animal confinement pen. These mats don't absorb liquids or pet bodily fluids or have any properties that cause food or other debris to stay on or in the general area of the mat.

There is no prior art for a mat placed under dog litter pans, comparable in use to cat litter boxes, or for a mat used in the areas where small animals are housed, under a bird, hamster, gerbil or other small animal cage.

The objective of this invention is to alleviate these described disadvantages and provide an efficient, multi-purpose pet areas mat for pet owners.

BRIEF SUMMARY OF THE INVENTION

This invention is a pet areas mat that is placed for cleanliness in areas where small animals eat, drink, are housed in a cage, or perform other functions, the use of a litter box or litter pan. The mat causes food, water, litter or other animal debris to be contained on or within close proximity to the mat, through absorption or confinement between the stays.

It is generally rectangular or oblong in shape and is constructed of one or more layers of material that is absorbent on one side and non-absorbent on the reverse side. The stays are constructed by stitching a binding to folds of the aforementioned material, in a horizontal, vertical or concentrical pattern. Binding is also sewn on the exterior perimeter of the mat. The mat may be optionally constructed with one or more open areas for placement of items, a litter box, litter pan, small animal cage or pet food or water dishes.

DETAILED DESCRIPTION

Figure 1:
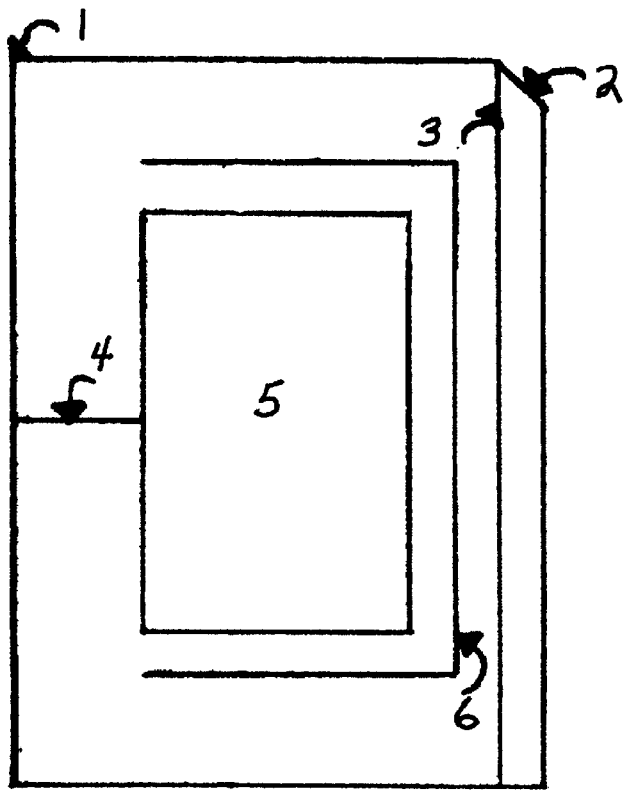
FIG. 1 is a top plan view of the pet areas mat, with abbreviated lines indicating the horizontal 4, vertical 3 or concentrical 6 options for the construction of the stays. The optional open area 5 in the center of the mat is for placement of a litter box, food or water dishes or a cage for a bird, hamster, gerbil or other small animal. The mat can be constructed either rectangular 1 or oblong 2.
Figure 2:
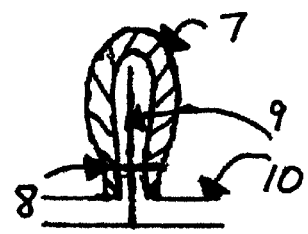
FIG. 2 is a cross section view of a stay of the pet areas mat. The binding 7 is attached by stitching 8 to a fold of the material having a non-absorbent, laminate backing 9 and an absorbent, non-woven material 10 on the reverse side.
Figure 3:
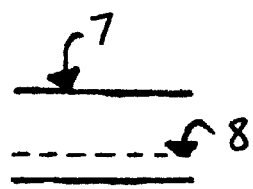
FIG. 3 is a front view of a stay of the pet areas mat indicating the stitching 8, which attaches the binding 7 to the fold of the material having a non-absorbent, laminate backing 9 and an absorbent, non-woven material 10 on the reverse side.

As shown in FIG. 1, the pet areas mat is generally rectangular 1 or oblong 2 in shape and is constructed of one or more layers of a material, a polypropylene laminated 9, non-woven 10, that is absorbent on one side and non-absorbent on the reverse side, forming a moisture barrier. The horizontal 4, vertical 3 or concentrical 6 stays are constructed by stitching 8, at various intervals, usually 1 inch to 4 inches apart, a binding 7 to folds of the aforementioned material. As detailed in FIGS. 2 and 3, the stays are sewn by grasping the material in the thumb and forefinger of one hand, placing a piece of binding 7 around the folded material and stitching 8 along the open edge of the binding 7. After the construction of the stays in the chosen pattern, binding 7 is also sewn around the perimeter of the mat. The resultant stays lie either flat, close to the bound edge of the mat, straight up or varying angles in between, as they are pliant for the animal to step on but resume their position due to the bulk of the stay and the stitching 8 at the base of the stay. The mat may be optionally constructed with one or more open areas 5, which do not have stays, for placement of food or water dishes, a litter box, a litter pan or small animal cages. These open areas 5 are not necessary for the effectiveness of the mat, as the stays bend with the weight of the objects placed on the mat. The mat may be constructed in any size needed, from a smaller size for placement of a bird cage to a larger size, made of a more sturdy laminated, non-woven material, for placement of a dog litter pan.

Cleanliness is maintained in pet areas through debris being contained on, or in close proximity to, the mat and liquids being absorbed by the mat. A cat exiting a litter box or a dog exiting a litter pan has litter on their feet, which is brushed off, by the stays and the binding 7 around the perimeter of the mat, and confined on the mat between the stays. When pet food dishes are placed on the mat, any food falling from the animal's mouth or spilling from the dish is confined between the stays. When a small animal cage, a bird, hamster or gerbil cage, is placed on the mat, any debris, bird seed, hamster or gerbil food, that falls from the cage or is scratched out of the cage is also confined between the stays. Liquids, the animal's drinking water or the animal's bodily fluids, are absorbed by the mat when the animal drinks from a water dish or exits a litter box or litter pan. Additionally, the floor under the mat and in the surrounding area is subjected to less wear by the debris resulting from the use of the area by pets. For the convenience of the pet owner, the mat is disposable and machine washable in cold water and must be air dried.

Two prototypes were constructed for testing, one, 20 inches by 30 inches, with vertical stays and the other, 24 inches by 31 inches, with horizontal stays. They were placed under a 12 inches by 18 inches cat litter box and pet food and water dishes for three weeks; had debris shaken off and discarded periodically during each week; and, were machine washed in cold water and air dried at the end of each week. The 24 inches by 31 inches size proved more effective for this test. The pet areas mat absorbed liquids, drinking water and the animal's bodily fluids, and contained animal debris, food and litter, on the mat or in close proximity to the mat, resulting in a significantly easier maintenance task, as debris is typically tracked throughout the dwelling. The mats showed minimal, if any, staining or wear and no shrinking after three weeks of use. They air dried in approximately an hour and cannot be machine dried. For the convenience of the pet owner, the mat is also disposable, if the quality of time the pet owner spends doing this maintenance task is an important factor.

A survey was conducted with a very limited sample, pet store owners or employees in the Champaign and Urbana, Ill. area. The results were very encouraging, as all participants liked the pet areas mat; said it would be useful and effective; thought their customers would buy it; and, said they would stock the item in their store. They expressed a need for a wide variety of sizes, which would require further testing to determine the most needed sizes. When questioned about price, packaging and manufacturing it in different colors, they responded as I had anticipated, making it very viable as a consumer item.

The pet areas mat is unique in construction, the properties of absorption and containment and convenience to the user. It is a very effective, multi-purpose mat for use by pet owners to effect cleanliness in pet areas. Existing devices are not multi-purpose, each device having only one use; not very effective in aiding cleanliness in pet areas, as they don't absorb liquids or contain debris within, or in close proximity to, the pet area; and, not convenient to the user, since they require hand washing and are not disposable. Pets are very much loved and cared for by pet owners, but do present the problem of the maintenance of the areas where they eat, drink, are housed or perform other functions. The pet areas mat solves these problems very efficiently for pet owners.

I claim as my invention:

1. A pet areas mat for use in maintaining cleanliness where small animals eat, drink, are housed in a cage, or perform other functions, the use of a litter box or litter pan, comprising:

one or more layers of material that is absorbent on one side, which absorbs liquids and the pet's bodily fluids, and non-absorbent on the reverse side, which provides a moisture barrier to the floor;

stays that are constructed in a horizontal, vertical or concentrical pattern, by grasping the aforementioned material in the thumb and forefinger of one hand, placing a piece of binding around the folded material and stitching along the open edge of the binding;

a generally rectangular or oblong shape having binding sewn around the perimeter of the mat to increase the amount of debris contained on the mat between the stays;

one or more optional open areas for placement of items, a litter box, a litter pan, a small animal cage or pet food or water dishes.

2. A pet areas mat, as defined in claim 1, which maintains cleanliness in pet areas by containing debris, food or litter, between the stays, or in close proximity to the mat; by absorbing liquids, pet drinking water or pet bodily fluids; and, by preventing the debris and liquids from reaching the floor under the mat.

3. A pet areas mat, as defined in claim 1, wherein said material is a polypropylene laminated, non-woven material that is absorbent on the non-woven side and non-absorbent on the polypropylene side, forming a moisture barrier.

4. A pet areas mat, as defined in claim 1, which is constructed in sizes, according to the use of the mat; such as a small mat for use under bird, gerbil, hamster or other small animal cages; a medium mat for use under a cat litter box or under pet food or water dishes; and, a large mat for use under a dog litter pan.

5. A pet areas mat, as defined in claim 1, that is constructed with one or more open areas, which do not have stays, for placement of food or water dishes, a litter box, a litter pan or small animal cages.

6. A pet areas mat, as defined in claim 1, that is unique in construction, the properties of absorption and containment, and convenience to the user.

7. A pet areas mat, comprised of at least one layer of a material that is absorbent on one side and non-absorbent on the other side, which is used for maintaining cleanliness in areas where small animals eat, drink, are housed in a cage, or perform other functions, the use of a litter box or litter pan;

and, has stays, constructed by stitching a binding around folds of the aforementioned material, generally at intervals of 1 inch to 4 inches, in a horizontal, vertical or concentrical pattern, and binding around the perimeter, both of which contain animal debris in the general area around and on the mat.

8. A pet areas mat, as defined in claim 7, that is rectangular or oblong in shape and large enough to extend sufficiently beyond any object placed on it to contain animal debris on the mat, or in close proximity to the mat, and to absorb liquids or animal bodily fluids.

9. A rectangular pet areas mat, as defined in claim 7, that is 20 inches by 30 inches, constructed with vertical stays and used under a cat litter box and cat food and water dishes.

10. A rectangular pet areas mat, as defined in claim 7, that is 24 inches by 31 inches, constructed with horizontal stays and used under a cat litter box and cat food and water dishes.

11. A pet areas mat, as defined in claim 7, that is constructed with one or more optional open areas, without stays, to hold pet devices, a litter box, litter pan, food dish, water dish or small animal cage, although these open areas are not necessary for the effectiveness of the mat.

12. A pet areas mat, as defined in claim 7, that is a multi-purpose mat for pet owners to effect cleanliness in the areas which small animals use, as it absorbs moisture and confines debris, keeps the general area around and on the mat cleaner than other devices and protects the flooring under the mat.

13. A pet areas mat, as defined in claim 7, that is very convenient for the user, as it is disposable and can be machine washed in cold water and must be air dried.

* * * * *